Sept. 9, 1941. O. G. GIESE 2,255,037
MOTION PICTURE FILM DEVELOPING APPARATUS
Filed Aug. 7, 1939 2 Sheets-Sheet 1
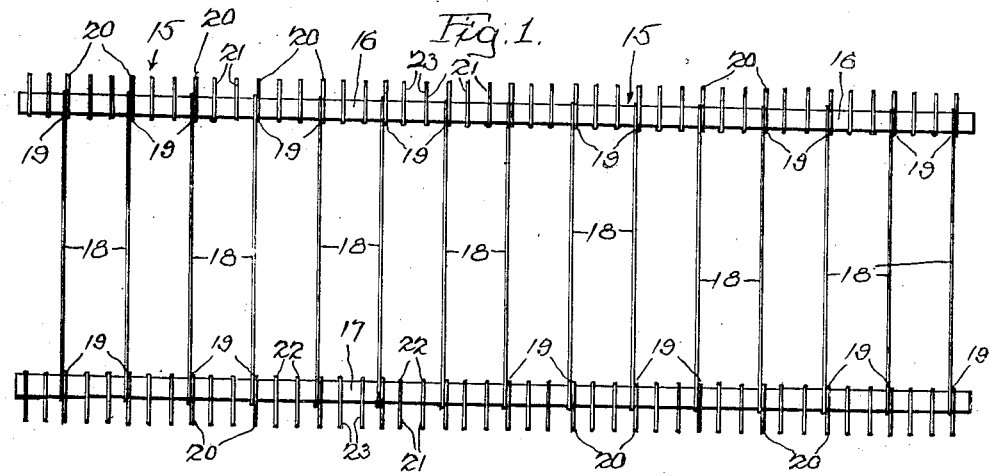
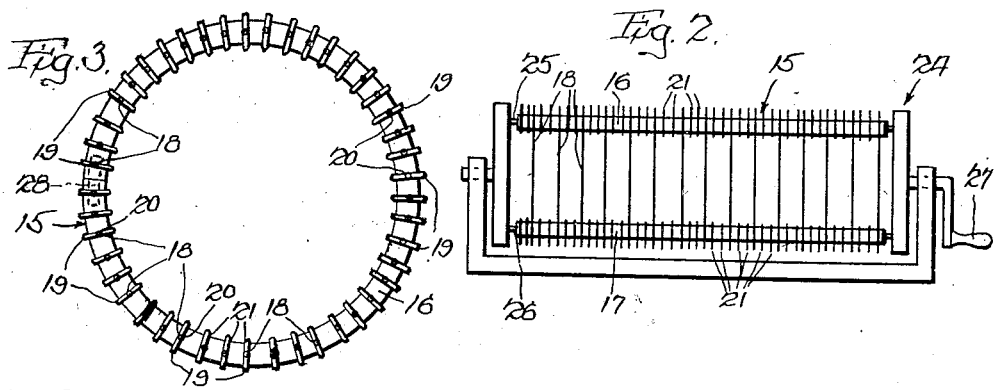
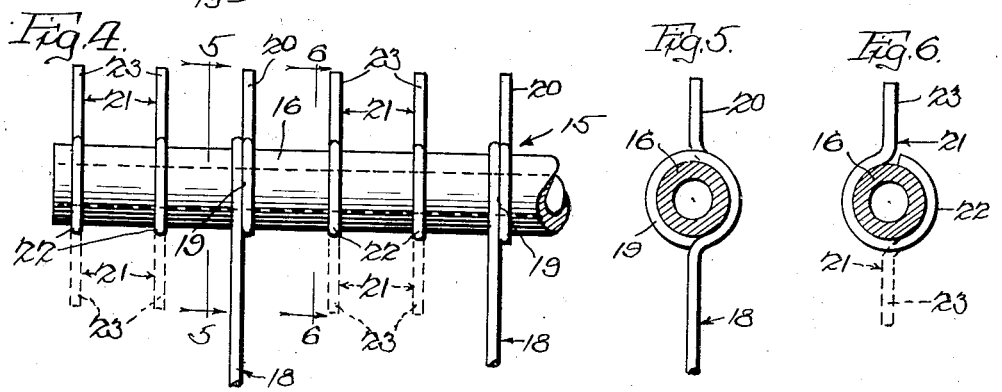
Inventor:
Otto G. Giese

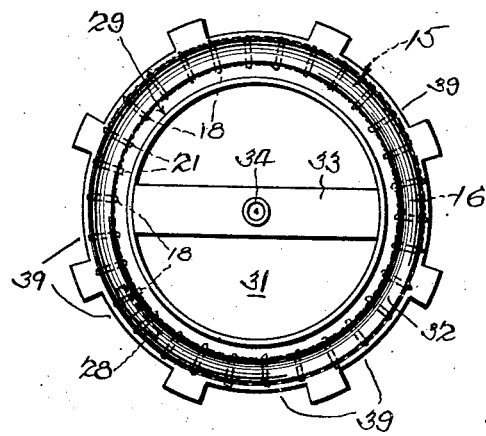
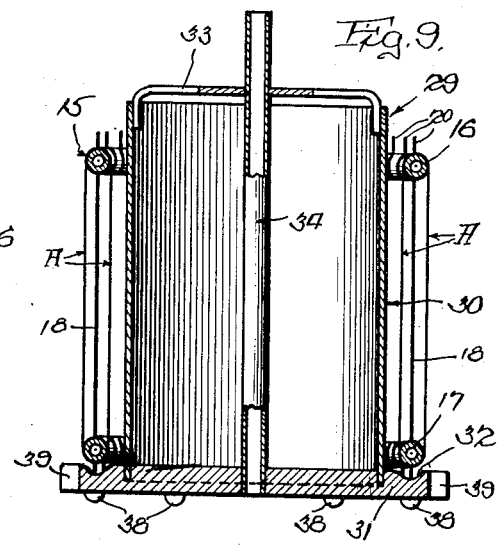
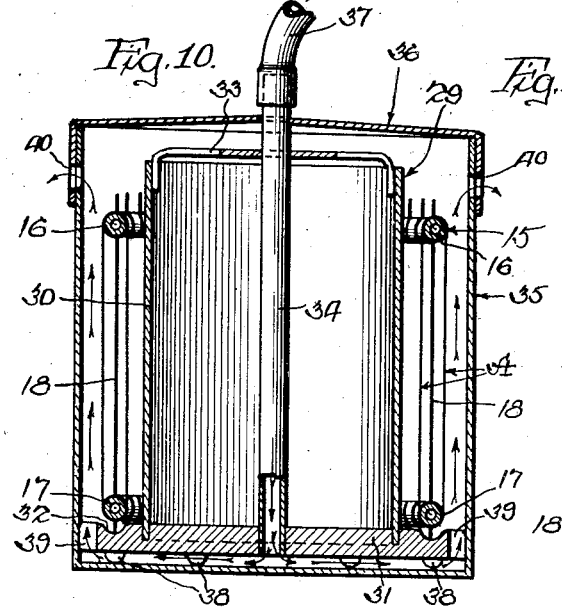
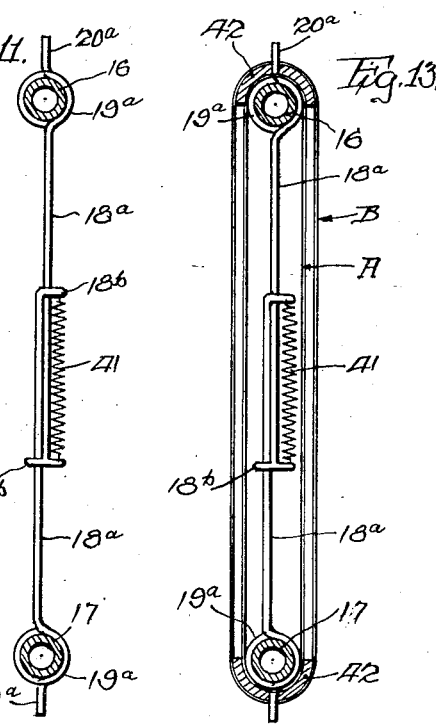
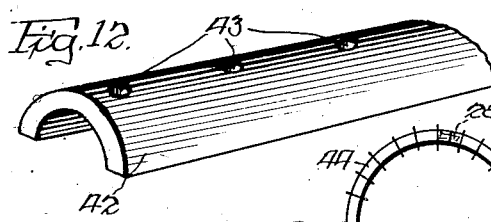
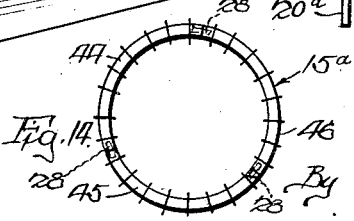

Patented Sept. 9, 1941

2,255,037

UNITED STATES PATENT OFFICE 2,255,037

MOTION PICTURE FILM DEVELOPING APPARATUS

Otto G. Giese, Chicago, Ill.

Application August 7, 1939, Serial No. 288,693

4 Claims. (Cl. 242—77)

This invention relates to improvements in a motion picture film developing apparatus.

Heretofore, various types of film developing apparatus have been proposed and each of which required a large amount of developing and fixing chemicals to be used in order to have a sufficient amount of solution to submerge the film, and in many of which apparatus, the film is passed through at a constant speed for developing the same without regard to the exposure time of the film in the solution, and the results are not quite as good as when the film is checked during its developing process for a greater or lesser time of exposure to the chemicals of the solution.

Further, the film is handled and rehandled in subjecting it to the various solutions and also to the washing and drying process, endangering the film by twisting, bending or cracking the same while it is transported to be placed into the various baths through which it is processed, and finally, the danger of scraping or otherwise bruising the film surface when suspending the same to be dried.

It is an object of the present invention to overcome the above objection, and the invention contemplates the use of a frame on which the film is coiled consecutively in a manner to expose the entire surface of the film. After the film has been coiled on the frame, the frame itself being of flexible material is then bodily curved to form a circular member and the adjacent abutting ends of the frame are then attached, which forms the frame and film into a cylinder. This cylinder is then positioned on a carrying drum, and when so positioned, the film is in spaced relation with the annular side wall of the drum, so as to permit of the free flow of the solution around the film. The carrying drum which is provided with a handle for manually gripping the same, is then bodily placed with the film thereon into a container which has a sufficient amount of solution therein so as to fully immerse the film, and the positioning of the carrying drum in the container will agitate the solution to keep the chemicals therein properly mixed.

After the proper exposure of the film to the solution, the solution may be poured out of the container while the carrying drum remains therein, or the carrying drum and film may be bodily removed and placed into another like container for the next operation. Whether the carrying drum and film remain in the same container or are placed in another container, the washing process is identical. The cover of the container is set in position to completely close the container and enclose the carrying drum and film and a hose is then attached to a tube that extends the entire length of and through the bottom of the carrying drum for directing water to the bottom of the container. The water rises in the space between the drum and container to immerse the film and is fed into the container with sufficient force to have constant motion to thoroughly wash the film, and in order to permit of the circulation of fresh water, the upper portion of the container is provided with apertures on opposed sides thereof which serve as overflow means for maintaining a constant level and to exhaust the surplus of water.

A further object of the invention is the provision of a flexible frame on which the film is wound, and on which it remains during all of its processes of developing and drying, and when removed, is in complete form for projecting purposes.

Another object is the provision of means applicable to the frame whereby a plurality of films may be wound on the same frame and developed and dried simultaneously.

A further object is the provision of adjustable film spacing means on the film carrying frame to accommodate for various sizes of films.

Other and further objects will become apparent from the ensuing description and the preferred embodiment of which is illustrated in the accompanying drawings in which:

Figure 1 is a side elevation of the film carrying frame.

Figure 2 is a small diagrammatical view of a manually operated winding device on which the film carrying frame is positioned while winding the film.

Figure 3 is a top plan view of a film carrying frame bent or coiled to form a cylinder after the film is placed thereon.

Figure 4 is an enlarged fragmentary detail view in side elevation of a portion of the film carrying frame, illustrating the film spacing means thereon.

Figure 5 is a cross sectional view taken substantially on the line 5—5 of Figure 4.

Figure 6 is a cross sectional view taken substantially on the line 6—6 of Figure 4.

Figure 7 is an enlarged detail view in side elevation of the connecting means for the abutting ends of the film carrying frame.

Figure 8 is a top plan view of the carrying drum with the film carrying frame in position thereon, shown in dotted lines.

Figure 9 is a medial sectional view of the carry-drum.

Figure 10 is a medial sectional view of the container and carrying drum positioned therein.

Figure 11 is an enlarged detail sectional view illustrating a resilient or yieldable film carrying frame.

Figure 12 illustrates an enlarged fragmentary perspective view of the means employed with the film carrying frame for supporting a plurality of films thereon.

Figure 13 is an enlarged detail sectional view, illustrating the means employed for mounting a plurality of films on the carrying frame; and Figure 14 is a modified form of carrying drum.

A developing device of the type illustrated may be used in the home, for commercial use, or in distant places where climatic conditions may make it necessary for the film to be developed soon after its exposure.

In illustrating the invention, the film carrying frame 15 consists of two flexible tubular members 16—17, respectively, which are retained in parallel spaced relation by means of relatively thin strap members 18. The strap members 18 are each provided with a coil 19—19 near each end thereof and with relatively short integral outwardly projecting ends 20—20, Figs. 4 and 5. The coil portions 19 receive one or the other of the tubular members 16 or 17, and these coils afford sufficient resistance to secure the strap members 18 in position on the tubular members. The strap members are spaced a sufficient distance apart so as to receive the largest width of film therebetween and the tubular members also carry manually adjustable strap members 21 arranged between each pair of strap members 18 so as to form means for spacing a smaller width of film on the same carrying frame. The strap members 21 are each provided with a loop 22, which encircle the tubular member, and which loops retain the members 21 adjustably positioned with respect to their sidewise movement, and for a rotary movement on the tubular member for positioning the end 23 of the strap member 21 into or out of engagement with the film, as indicated in dotted lines Figs. 4 and 6. These strap members 21 when properly positioned on the tubular members 16 or 17, provide the required space for the narrower widths of films.

In applying the film to the carrying frame 15, the frame is bodily positioned on a manually operated winding device 24, Fig. 2, by inserting a pair of rods 25—26 thereof into the tubular members 16 and 17, respectively, and which rods support the film carrying frame 15 to be bodily turned by the handle 27. The film A is then introduced, and its free end is attached in any suitable manner to one end of one of the tubular members 16 or 17 and the handle 27 is manually gripped to turn the film carrying frame. The turning of the film carrying frame 15 causes the film to be wound thereon, and while winding the same, the film is manually guided so as to be coiled the entire length of the frame or until the film is exhausted, and at which time, the end of the film is securely attached to the film carrying frame in any suitable manner.

After the film A has been completely coiled on the film carrying frame 15, the frame and film are removed from the winding device 24 and the film carrying frame 15 is then flexed or bent to form a cylinder, Fig. 3, and the abutting ends of the tubular members 16 and 17 are then attached by means of plug connectors 28, Fig. 7.

As the film is coiled consecutively on the frame 15, it will be noted that an easy flexing of the tubular members 16 and 17 may be had without distorting, bending or otherwise mutilating the film.

The carrying frame 15 is then bodily placed over a carrying drum 29, and as the film A is wound on the upper and lower tubular members 16—17 of the film carrying frame 15, it surrounds the carrying drum 29 and is in spaced relation with the side wall 30 thereof, providing a space therebetween.

When the film carrying frame 15 and film A are in position on the carrying drum 29, the projecting ends 20 of the strap members 18 will rest upon a base 31 of the carrying drum 29. The base 31 is provided on its top surface with an annular groove 32 which is spaced outwardly of the side wall 30 of the drum, and it is in this annular groove 32 that the projecting ends 20 of the straps 18 rest and retain the film carrying frame 15 in spaced relation with the side wall of the drum.

The carrying drum 29 is provided at its top portion with a transversely extending member 33, forming a handle to be manually gripped to carry the drum, and this transverse member 33 also serves to support the upper end of a tube 34 which extends longitudinally and centrally of the carrying drum and through the base 31 thereof.

After the film and frame have been positioned on the carrying drum, the handle 33 is manually gripped and the carrying drum is bodily placed within a container 35 which has a certain amount of developing solution therein and when the carrying drum is placed into the container 35, it displaces the solution therein to cause the same to rise in the container on the outer side of wall 30 of the carrying drum 29 to immerse the film. The positioning of the carrying drum in the container serves also to agitate the solution and to keep it properly mixed, so that a perfect developing of the film will be had.

After the film has been exposed to the solution in the container 35 for the proper length of time in accordance with the kind of film being developed, the handle 33 of the carrying drum may again be gripped and the drum removed to inspect the film preparatory to the washing process, or to be replaced within the container for further developing. During the developing operation, a cover 36 may be placed on the container to enclose the same and seal the light from the film and the cover may also serve for preventing the solution from being exposed to the elements and preventing the deposits of dirt and other foreign substances in the solution when the device is not in use.

After the film has been properly exposed to the developing solution, the solution may be poured out of the container 35 while the carrying drum and film are in position, or the carrying drum may be bodily removed and placed into a like container for the washing process. Whether the same container or another container is used for the washing process of the film the washing is accomplished in the following manner: A flexible hose 37 is attached to the upper end of the tube 34 and its other end to a water supply which is fed through the hose 37 and tube 34 and directed through the drum 29 to the bottom of the container 35. As the carrying drum 29 is provided with a plurality of supporting feet 38, the base 31 of the carrying drum is retained in spaced relation with the bottom of the container, and the flow of water is directed between the bottom of the container and the underside of the base 31 and around the wall 30 of the carrying drum. The base 31 of the carrying drum 29 is provided with a plurality of relieved portions 39 which permit the water to rise between the container and drum to immerse the film.

The container 35 is provided near its top portion and on opposed sides thereof with openings 40 through which the water may flow to exhaust the surplus thereof, and providing means for a continuous circulation of water within the container. The openings 40 in the container are located in a position to maintain a water level above the film to immerse the same to rapidly and thoroughly wash the film.

After the film has been thoroughly washed, it is then placed into a fixing bath and this bath may be arranged in the same manner as when developing, that is, the water may be poured out of the container 35 and the fixing solution poured therein or the carrying drum 29 may be bodily positioned into a like container for the fixing process, and also the final washing operation may be accomplished in the same manner as above described for washing the film after the developing operation. During the washing process of the film, it will be noted that the openings 40 in the container 35 are relatively small and retard somewhat the outer flow of the water thereby permitting the water to be forced around the film and in effect, crowding to wash the same for a thorough cleaning process.

The frame 15 is capable of supporting more than a single film at one time during the developing and finishing processes and in order to accomplish perfect results during this operation, the frame straps are arranged in a resilient manner, as indicated in Figs. 11 and 13. In Fig. 11, the straps are designated as 18a and are arranged in two sections that are in sliding relation with respect to each other, and a tension spring 41 is interposed between the free ends 18b of the strap members 18a for urging them outwardly. In this form, the film A is first wound on the film carrying frame 15 in the manner as above described, and then a flexible semi-circular member 42, the length of the tubular members 16 and 17 and provided with a plurality of apertures 43 therein, is placed over each of the tubular members 16—17 and the ends 20a of the straps 18a extend through the apertures 43 and the body of the semi-circular member 42 then rests on the loops 19a of the straps 18a retaining the members 42 in spaced relation with the wound film A. When the members 42 are in this position, a second film designated as B, is wound on the frame over the opposed semi-circular members 42 which support the film B in spaced relation with the film A, and this film B is also guided between the projecting ends 20a of the straps 18a.

The purpose of providing a member 42 adjacent each of the tubular members 16 and 17 is for spacing the two films A and B, and the tension spring 41 serves to maintain a constant outward pressure on the straps 18a to urge the tubular members 16 and 17 and the semi-circular members 42—42 against their respective films A and B, so that when they are immersed in the solution which naturally softens the films, their tendency is to yield or stretch and the tension of spring 41 serves to keep them taut and free from frictional contact with each other, and permits of the circulation of the solution around both of the films.

After the developing, washing, fixing and again washing processes of the film, the carrying frame 15 is removed and the connectors 28 are removed to release the abutting ends of the film carrying frame 15 which again assumes a relatively straight position, and it may be suspended in any suitable manner for the drying of the film, the same being true of a single or double film on the same frame.

It will be noted that the film when once applied to the carrying frame 15, remains thereon during the entire developing process up to the time that the film is thoroughly dried before it is removed, and in this manner, eliminates the handling and possibility of cracking, bending, or otherwise scraping the film, and further providing for a thorough, complete developing process with a relatively small amount of effort and expense. Also, the amount of chemical used for the solution is reduced to a minimum by reason of the carrying drum displacing the solution within the container.

In Figure 14, a modified form of film carrying frame is shown. This frame 15a comprises a plurality of sections 44, 45 and 46 which are adapted to be bent or flexed and joined together to form a cylinder in the same manner as that shown in Figure 3.

In this instance, the frame 15a is constructed of individual sections on each of which a film may be coiled, and then the sections are bent and assembled to form a complete unit and the abutting ends of each section are connected by means of a connector 28. In this construction, it is possible to coil short lengths of film on each of the sections and to put them through the developing and washing processes and then separate the sections to dry the individual films on their respective sections.

The films may be arranged in overlapped relation by utilizing a semi-circular member 42 of the same length of each of the sections 44, 45 or 46, and when the sections are separated, they may be separately handled to be dried.

I claim:

1. A motion picture film developing apparatus comprising a film carrying frame having spaced apart parallel flexible members, a series of strap members between the said flexible members retaining them in spaced relation and with the ends of said strap members projecting outwardly of each of said flexible members and adapted to receive a film therebetween, and a plurality of relatively short strap members on each of said flexible members and positioned between the series of strap members, the last-mentioned strap members being arranged for bodily swinging movements and for longitudinal adjustments on said flexible members whereby to adjust them for various widths of films.

2. A motion picture film developing apparatus comprising a substantially rectangular film carrying frame having spaced apart parallel members, a series of strap members on the parallel members and having outwardly projecting portions betweens which the film is coiled, said series of strap members being swingable and slidable on the parallel members for adjustment to accommodate for various widths of films, said frame being adapted to be bent to form a cylinder and with its ends in abutting relation, and means for securing the abutting ends of said frame whereby the frame and film may be retained in cylindrical position during the developing of the film.

3. A motion picture film developing apparatus comprising a substantially rectangular frame having a series of outwardly projecting portions and between which projections a film is coiled, a flexible member removably positioned on opposite side edges of the frame and adapted to be engaged by said projections and in spaced relation with the film for receiving a second film coiled thereon, said frame and flexible members being adapted to be bent in the form of a cylinder with said first and second-mentioned films thereon, and means for securing the opposed ends of said frame together.

4. A motion picture film developing apparatus comprising a rectangular frame on which a film is adapted to be coiled, said frame comprising a pair of spaced-apart parallel members, a series of strap members between the said pair of members, each of said strap members being composed of two portions connected for longitudinal sliding movements, spring means coacting with said portions to urge the flexible members apart and for maintaining a constant tension on the film coiled on said frame, and a plurality of relatively short strap members on each of the parallel members and positioned between said first-mentioned strap members for receiving the film therebetween, said short strap members being swingable and slidable on the parallel members whereby to adjust them for various widths of films.

OTTO G. GIESE.